350-173

CROSS REFERENCE SEARCH ROOM

TX 350/173

April 18, 1967 H. G. WRIGHT 3,315,030

OPTICAL SYSTEM FOR COLOR TELEVISION CAMERAS

Filed Nov. 18, 1964 2 Sheets-Sheet 1

INVENTOR.
HARRY G. WRIGHT
BY
W. H. Sponagle
ATTORNEY

April 18, 1967 H. G. WRIGHT 3,315,030

OPTICAL SYSTEM FOR COLOR TELEVISION CAMERAS

Filed Nov. 18, 1964 2 Sheets-Sheet 2

INVENTOR.
HARRY G. WRIGHT
BY
W. H. Spouagle
Attorney

United States Patent Office 3,315,030

Patented Apr. 18, 1967

3,315,030

OPTICAL SYSTEM FOR COLOR TELEVISION CAMERAS

Harry G. Wright, Haddonfield, N.J., assignor to Radio Corporation of America, a corporation of Delaware Filed Nov. 18, 1964, Ser. No. 412,070
4 Claims. (Cl. 178—5.4)

This invention relates to an optical system for a color television camera and particularly to a camera having a single luminance signal pickup tube and a plurality of chrominance signal pickup tubes.

One proposed type of color television camera employs a pickup device of the image orthicon type for the derivation of luminance signal information and a plurality (such as three) separate pickup devices of the vidicon type for the derivation of the chrominance signal information. An advantage of this kind of color television camera over the three-tube variety presently in use is that high definition luminance signals may be derived directly from the image orthicon, thereby obviating the need for precise registration of the images on a three-tube color camera such as presently employed. The required relatively low resolution chrominance signal components may then be derived from the three vidicon tubes for the production of the composite chrominance signal specified in the color television system presently standardized for U.S. use by the Federal Communications Commission.

It has been found convenient for such a camera to use a single lens system for gathering light from a subject. Such a lens is of the zoom variety, that is, one having a variable focal length. For symmetry of design it is desirable to have such a lens system centrally located in the camera with the luminance signal pickup tube mounted on one side and the plurality of chrominance signal pickup tubes mounted on the other side. An image orthicon tube may be used as the luminance signal pickup tube and smaller vidicons may serve as the chrominance signal pickup tubes. It also is desirable to arrange the pickup tubes and the other necessary circuit control apparatus in the camera together with the light gathering lens system and view finder apparatus as compactly as possible.

The optical system of such a television camera must include a light divider to direct suitable parts of the subject-representative light from the light gathering lens system respectively to the luminance and chrominance signal pickup tubes. Other light dividing apparatus which is color selective is required to direct the several different color components of the subject representative light to the respective chrominance signal pickup tubes. In designing such a camera, any arrangement of the chrominance signal pickup tubes in a horizontal plane with the light gathering lens system and the luminance signal pickup tube requires a camera housing which would have a greater than desired horizontal dimension. It is preferable, therefore, to mount the chrominance signal pickup tubes vertically. When this is attempted, however, it is found that a longer effective light path is needed on the chrominance signal pickup tube side of the light gathering lens system than the light path on the luminance signal pickup tube side.

It, therefore, is an object of this invention to provide an optical system for use in a color television camera (including a single luminance signal pickup tube and a plurality of chrominance signal pickup tubes) which has a longer back focal distance on the chrominance signal pickup tube side of a common light gathering lens system than on the lumnance signal pickup tube side of the light gathering lens system.

The light derived from a subject frequently is partially polarized because of reflections from some areas of the subject. Such polarized light does not adversely affect the operation of black and white television cameras. It has been found, however, that, because of the particular color selective light dividing apparatus used in color television cameras, such light polarization may adversely affect the operation of color cameras. In prior art three-tube color television cameras the color selective light dividing apparatus used with the blue and red chrominance signal pickup tubes included dichroic and other reflectors set at 45° angles to the respective light paths. No light dividing reflectors are used in the optical channel to the green chrominance signal pickup tube. Such angular positioning of these reflectors renders them sensitive to the polarization of the light incident thereon. As a consequence, the amount of blue and red subject-representative light conveyed through the corresponding optical channels to the blue and red pickup tubes is considerably less than the green subject-representative light conveyed to the green pickup tube. Unless corrective steps are taken undesired green highlights are present in the picture reproduced from signals derived from the pickup tubes. Present color television cameras use a polarizer disc in the optical system ahead of the color selective light dividing apparatus so as to modify the polarization characteristic of the subject-representative light suitably to reduce the unwanted green highlights. Such as expedient, however, has had only limited success and has entailed some unwanted loss of light.

Accordingly, it is another object of the present invention to provide an optical system for a color television camera which functions to reduce the unwanted polarization by the optical elements of the light directed to the different chrominance signal pickup tubes and which does not require the use of additional correcting elements which attenuate the light.

In accordance with the invention an optical system is provided for a color television camera (including a luminance signal pickup tube and a plurality of chrominance signal pickup tubes) in which the light path to the chrominance signal pickup tubes is made effectively longer than the light path to the luminance signal pickup tube by the inclusion in the former of apparatus having a higher index of refraction than air. Such an arrangement permits the mounting of the chrominance signal pickup tubes vertically on the opposite side of a light gathering lens system from the luminance signal pickup tube, thereby enabling a compact design of the camera. Also, this effective path lengthening on the chrominance signal pickup tube side enables the mounting of the dichroic reflectors of the chrominance light divider at angles relative to the light paths which differ from 45°. Preferably, the angles of light incidence and reflection are less than 45° and in a presently preferred arrangement are approximately 35°, thereby rendering these reflectors less sensitive to the polarization of the light incident thereon and thus more efficient in their operation.

For a better understanding of the invention, reference now is made to the following description taken in conjunction with the accompanying drawings of which:

Figure 3:
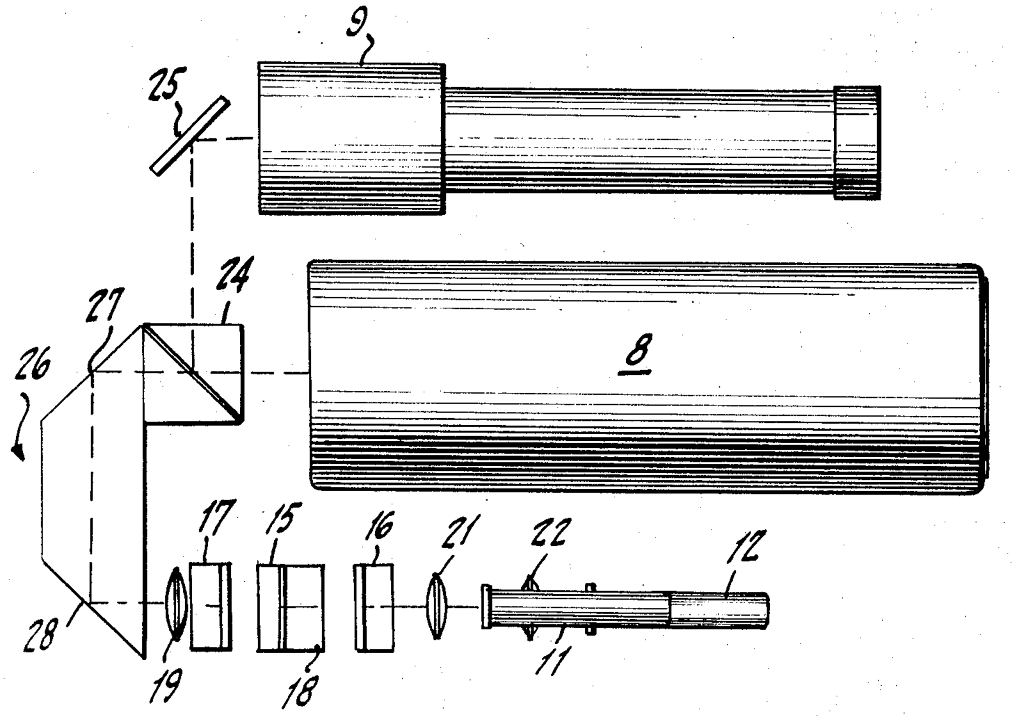
Figure 4:
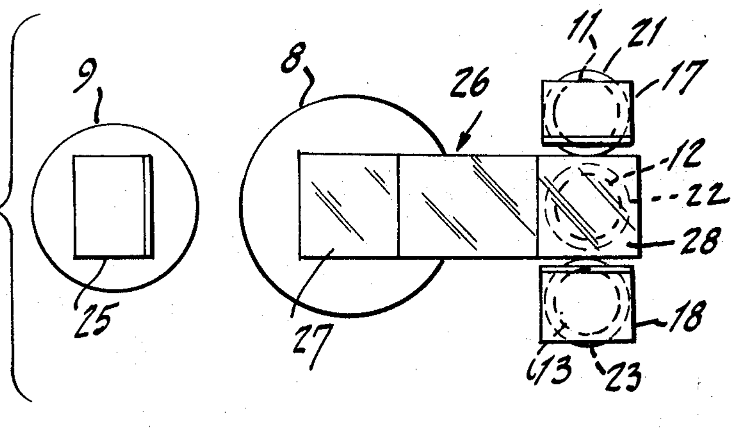

FIGURE 3 is a diagrammatic plan view of the optical apparatus embodying the invention showing the relative positioning of the subject-representative light gathering lens system and the luminance and chrominance signal pickup tubes; and FIGURE 4 is an end view of the optical apparatus embodying the invention showing the relative positioning of the luminance and chrominance signal pickup tubes and associated optical apparatus as seen from the back of the camera.

Figure 1:
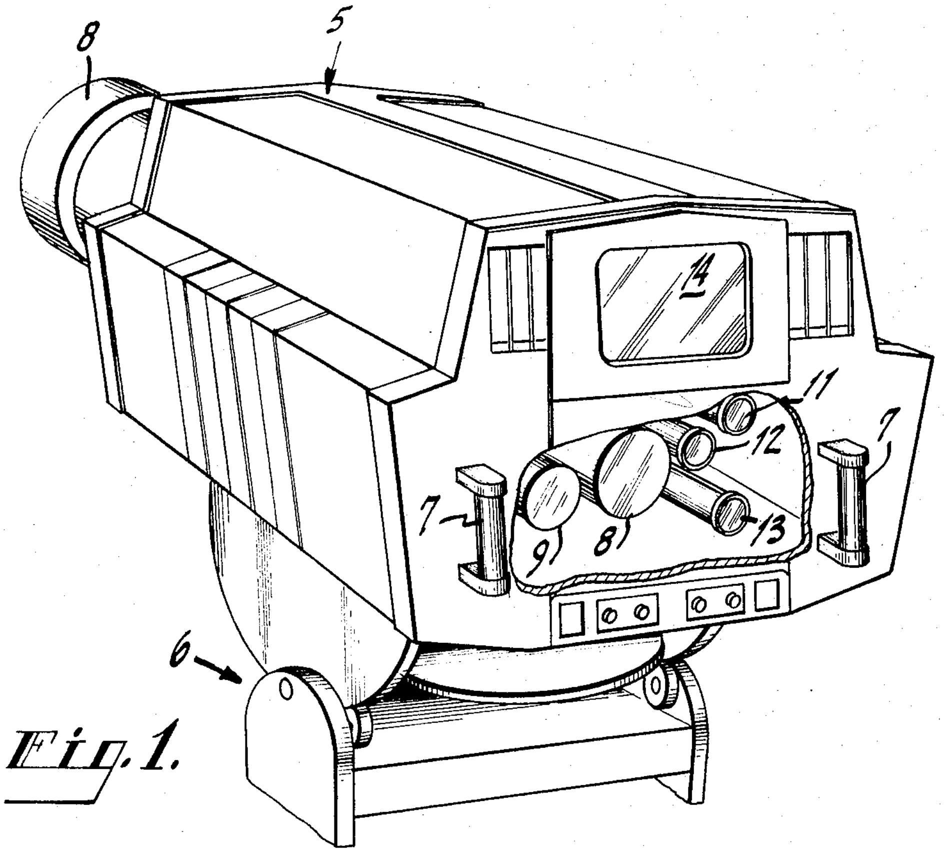
FIGURE 1 is a perspective view of a color television camera embodying the invention taken from the rear and being partially cut away to indicate the general disposition of the various pickup tubes relative to the subject-representative light gathering optical system.

In FIGURE 1, to which reference first will be made, the camera housing 5 is mounted on a known type of support 6 for movement in either or both of vertical and horizontal planes by means such as handles 7 for manipulation by an operator. The camera is provided with a single subject-representative light gathering lens system 8 which is of the variable focal length type and which protrudes from the front of the housing 5 and extends rearwardly within the housing along the central longitudinal axis of the camera. The camera also is provided with a luminance signal pickup tube 9 which may be an image orthicon and which is located on one side of the light gathering lens system 8. Three vidicon type chrominance signal pickup tubes 11, 12 and 13 responsive respectively to the blue, green and red components of the subject light are mounted one above the other in a vertical plane on the side of the light gathering lens system 8 opposite to that on which the luminance signal pickup tube 9 is located. In this figure there is not shown any of the light dividing apparatus by which the subject-representative light is directed to the various pickup tubes. Such apparatus is more clearly illustrated in other figures of the drawings and will be described later. The camera also includes a view finder 14 in the usual form of a cathode ray tube, in a position to be observed by the camera operator, and other circuit elements for operation and control of the camera. Such apparatus is located generally in the upper part of the camera housing 5. Because none of this apparatus is necessary to an understanding of the present invention, it has not been shown and will not be further referred to.

Figure 2:
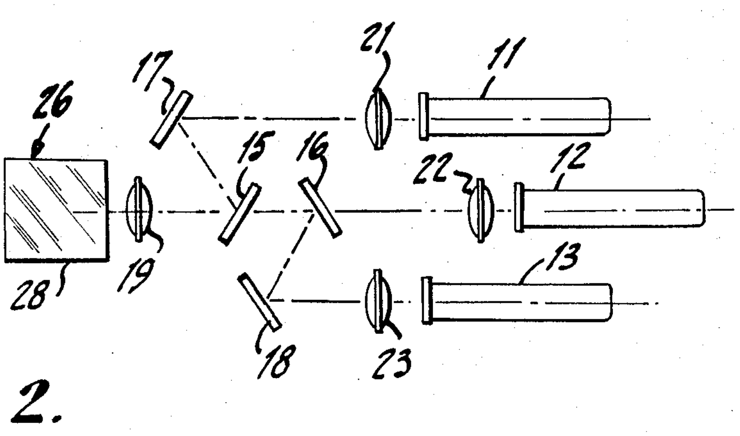
FIGURE 2 is a diagrammatic representation of the vertical arrangement of the chrominance signal pickup tubes relative to the color selective light dividing apparatus and associated optical devices.

In FIGURE 2 the chrominance signal pickup tubes 11, 12 and 13 are shown approximately in their desired positions relative to one another and to the optical apparatus used therewith. This apparatus includes a light divider comprising blue and red light reflecting dichroic mirrors 15 and 16. Also, panchromatic reflectors or mirrors 17 and 18 are included in the light paths to the blue and red chrominance signal pickup tubes 11 and 13, respectively. Light is directed into this light dividing system from a field lens 19 in the plane of which light from the subject is imaged by other optical apparatus to be described. The light is divided into component colors by reflecting the blue light upwardly from the dichroic mirror 15 through which is transmitted green and red light. The red light is separated from the green light by the dichroic mirror 16 and is directed to the mirror 18. Only the green light remains for transmission through the dichroic mirror 16 toward the green chrominance signal pickup tube 12. The blue, green and red subject-representative light is reimaged respectively in the lenses 21, 22 and 23 so that blue, green and red signals representative of the subject are produced by the blue, green and red pickup tubes 11, 12 and 13.

A plan view of the optical apparatus embodying this invention is shown in FIGURE 3. At the rear of the light-gathering lens system 8 a prismatic panchromatic light divider 24 receives the subject-representative light and reflects a portion of it to a reflector 25 from which it is directed to the luminance signal pickup tube 9. Another portion of the light received by the divider 24 is transmitted to a trapezoidal prism 26 having surfaces 27 and 28 to reflect the light first to one side of the lens system 8 and again toward the front of the camera where the subject-representative light is imaged in the field lens 19 previously described.

FIGURE 4 is an end view of the optical system of the color television camrea as viewed from the left of FIGURE 3. This view shows that the luminance signal pickup tube 9 is located at the left of the lens system 8 and the chrominance signal pickup tubes 11, 12 and 13 are vertically arranged at the right of the lens system 8.

The light path from the lens system 8 to the luminance signal pickup tube 9 is principally in air, the only exception being the relatively short distance light travels through the panchromatic light divider 24. The light path from the lens system 8 to the chrominance signal pickup tubes, 11, 12 and 13 is principally through the light divider 24 and the trapezoidal prism 26 which are media having an index of refraction greater than air. The effective length of the light path from the lens system 8 to the field lens 19 on the chrominance signal pickup tube side is made to equal the light path of the lens system 8 to the luminance signal pickup tube 9. This enables the vertical mounting of the chrominance signal pickup tubes 11, 12 and 13 approximately as close to the centrally located lens system 8 as the luminance signal pickup tube is mounted relative to this lens system.

Again with reference to FIGURE 2 the effective lengthening of the light path to the chrominance signal pickup tubes also enables the location of the color selective light dividing elements 15, 16, 17 and 18 at angles other than 45° relative to the respective light paths. More particularly, in FIGURE 2, the angles of incidence and reflection of the light derived from the field lens 19 and impinging upon the dichroic reflector 15 are approximately 35°. The other elements 16, 17 and 18 also are so mounted that the angles of incidence and reflection of the light impinging thereon are approximately 35°. It has been found that such angular positioning of the light divider elements renders these elements less sensitive to the polarization of the light impinging thereon, thereby increasing the amount of light conveyed to the blue and red pickup tubes over the amount of light conveyed to these tubes by the prior art apparatus. It may be seen from FIGURE 2 that the subject-representative light reaching the green pickup tube 12 is not reflected by any of the crominance light divider elements 15, 16, 17 and 18, and, hence, this light is not attenuated because of any polarized portions thereof. The subject-representative light reaching the blue and red pickup tubes 11 and 13, on the other hand, is twice reflected and, as a result, some polarized portions thereof may be attenuated to an extent dependent upon the angles of reflection. By decreasing these reflection angles the attenuation of any polarized light impinging upon the blue and red pickup tubes 11 and 13 is reduced sufficiently to render the response by these tubes to be not objectionably different from the response by the green pickup tube 12. The provision by this invention of the longer light path to the chrominance signal pickup tubes enables the positioning of the color selective light divider elements so as to achieve such smaller angles of light reflections and, thus, reduce the attenuation of the blue and red components of the light.

What is claimed is:

1. In a color TV camera comprising a luminance signal pickup tube located at one side of the central longitudinal axis of said camera and responsive to all color components of subject-representative light and a plurality of vertically arranged chrominance signal pickup tubes located at the other side of said central longitudinal camera axis and respectively responsive to selected color components of subject-representative light, an optical system for admitting light from a subject and directing suitably selected portions of said admitted light to said respective pickup tubes comprising in combination:

a subject-representative light gathering lens system located on said central longitudinal camera axis;

a panchromatic light divider located to receive subject-representative light from said lens system and to direct a first part of said light toward said luminance signal pickup tube and a second part of said light toward said chrominance signal pickup tubes;

the light path from said lens system to said luminance signal pickup tube being principally in air and having a given length;

a trapezoidal prism located to receive said second light part and to direct it in a horizontal plane toward said chrominance signal pickup tubes, and providing a light path from said lens system to said chrominance signal pickup tubes which is greater than said given length; and a multi-element color-sensitive light divider located to receive said second light part from said trapezoidal prism and to direct different color light components in a vertical plane respectively to said plurality of chrominance signal pickup tubes.

2. In a color TV camera comprising a luminance signal pickup tube located at one side of the central longitudinal axis of said camera and responsive to all color components of subject-representative light and a plurality of vertically arranged chrominance signal pickup tubes located at the other side of said central longitudinal camera axis and respectively responsive to selected color components of subject-representative light, an optical system for admitting light from a subject and directing suitably selected portions of said admitted light to said respective pickup tubes comprising in combination:

a variable focal length lens system located on said central longitudinal camera axis, said lens system having one end protruding from the front of said camera and its other end located adjacent the rear of said camera;

a panchromatic light divider located to receive subject-representative light from said lens system and to direct a first part of said light toward said luminance signal pickup tube and a second part of said light toward said chrominance signal pickup tubes;

the light path from said lens system to said luminance signal pickup tube being principally in air and having a given length;

a trapezoidal prism located to receive said second light part and to direct it in a horizontal plane toward said chrominance signal pickup tubes, and providing a light path from said lens system to said chrominance signal pickup tubes which is greater than said given length; and a multi-element color-sensitive light divider located to receive said second light part from said trapezoidal prism and to direct different color light components in a vertical plane respectively to said plurality of chrominance signal pickup tubes;

the elements of said color-sensitive light divider being so positioned that the angles of light incidence thereon and light reflection therefrom differ significantly from forty-five degrees.

3. In a color TV camera comprising a luminance signal pickup tube located at one side of the central longitudinal axis of said camera and responsive to all color components of subject-representative light and a plurality of vertically arranged chrominance signal pickup tubes located at the other side of said central longitudinal camera axis and respectively responsive to selected color components of subject-representative light, an optical system for admitting light from a subject and directing suitably selected portions of said admitted light to said respective pickup tubes comprising in combination:

a variable focal length lens system located on said central longitudinal camera axis, said lens system having one end protruding from the front of said camera and its other end located adjacent the rear of said camera;

a panchromatic prismatic light divider located to receive subject-representative light from said lens system and to direct a first part of said light toward said luminance signal pickup tube and a second part of said light toward said chrominance signal pickup tubes;

a trapezoidal prism located to receive said second light part and to direct it in a horizontal plane toward said chrominance signal pickup tubes; and a multi-element color-sensitive light divider located to receive said second light part from said trapezoidal prism and to direct different color light components in a vertical plane respectively to said plurality of chrominance signal pickup tubes;

the elements of said color-sensitive light divider being so positioned that the angles of light incidence thereon and light reflection therefrom differ significantly from forty-five degrees.

4. In a color TV camera comprising a luminance signal pickup tube located at one side of the central longitudinal axis of said camera and responsive to all color components of subject-representative light and a plurality of vertically arranged chrominance signal pickup tubes located at the other side of said central longitudinal camera axis and respectively responsive to selected color components of subject-representative light, an optical system for admitting light from a subject and directing suitably selected portions of said admitted light to said respective pickup tubes comprising in combination:

a variable focal length lens system located on said central longitudinal camera axis, said lens system having one end protruding from the front of said camera and its other end located adjacent the rear of said camera;

a panchromatic prismatic light divider located to receive subject-representative light from said lens system and to direct a first part of said light toward said luminance signal pickup tube and a second part of said light toward said chrominance signal pickup tubes;

a trapezoidal prism located to receive said second light part and to direct it in a horizontal plane toward said chrominance signal pickup tubes; and a muilti-element color-sensitive light divider located to receive said second light part from said trapezoidal prism and to direct different color light components in a vertical plane respectively to said plurality of chrominance signal pickup tubes;

the elements of said color-sensitive light divider being so positioned that the angles of light incidence thereon and light reflection therefrom are less than forty-five degrees.

References Cited by the Examiner

UNITED STATES PATENTS

| | | | |
|---|---|---|---|
| 1,319,292 | 10/1917 | Kunz | 88—1 |
| 1,371,970 | 3/1921 | Furman | 88—1 |
| 2,971,051 | 2/1961 | Back | 178—5.4 |
| 3,167,681 | 1/1965 | Dischert | 178—5.4 X |

DAVID G. REDINBAUGH, *Primary Examiner*,

J. A. O'BRIEN, *Assistant Examiner*.